May 10, 1932. T. B. LAVELLE 1,857,962
LATERAL CONTROL MEANS FOR AIRPLANES
Filed Nov. 8, 1930
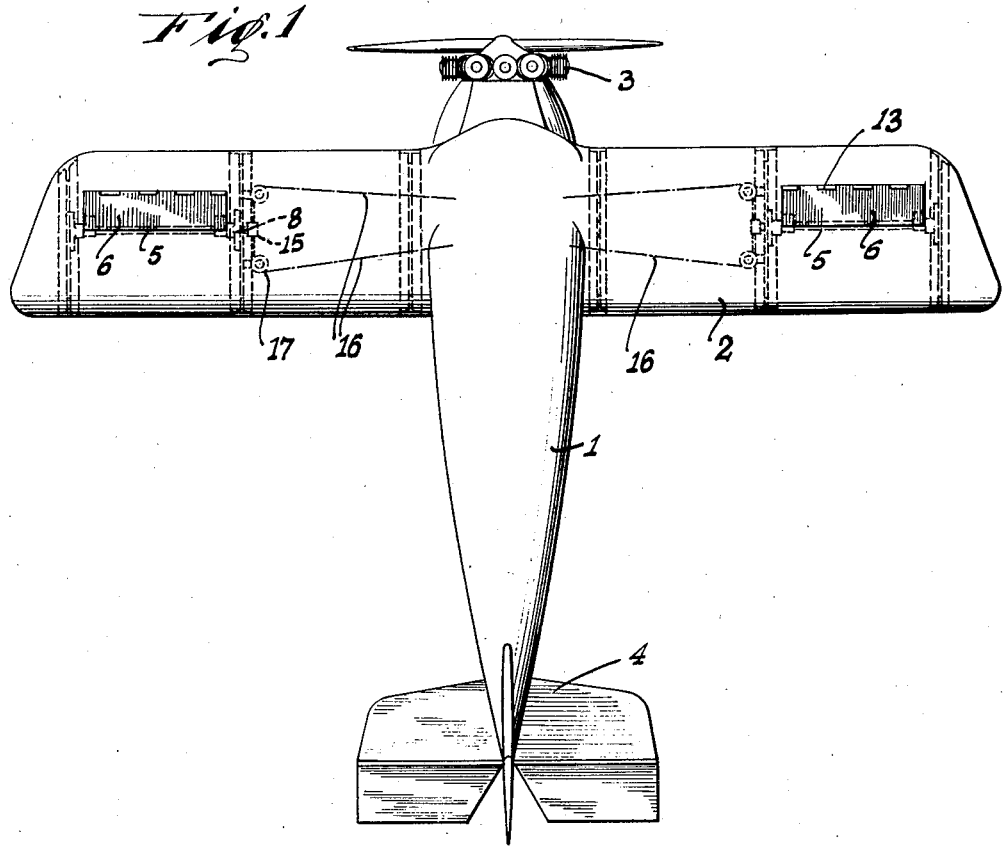
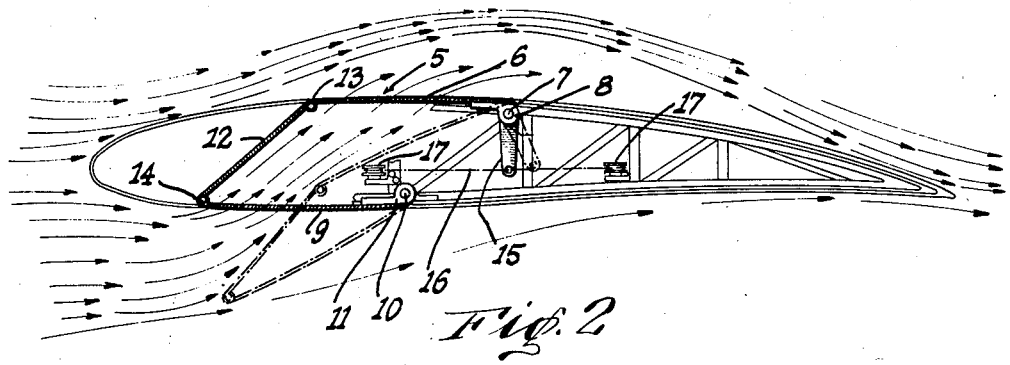
Thomas B. Lavelle
INVENTOR
BY ATTORNEY Patented May 10, 1932

1,857,962

UNITED STATES PATENT OFFICE

THOMAS B. LAVELLE, OF HEMPSTEAD, NEW YORK

LATERAL CONTROL MEANS FOR AIRPLANES

Application filed November 8, 1930. Serial No. 494,265.

This invention relates to airplanes and my improvement is directed to a novel means of providing for lateral control, without the use of ailerons.

Briefly expressed my invention consists in the provision of slots formed through the supporting airfoil, near each outward portion thereof and toward the leading edge, together with individual means for closing and opening said slots.

These slots are inclined rearwardly in an upward direction, so that when a slot at one side of the airfoil is opened air pressure from below will be relieved through the slot and also the partial vacuum above the airfoil will be broken, thereby diminishing the support at that side which thus becomes the low side in banking, as for a turn.

Obviously, while the slot at one side of the airfoil is open the slot at the other side will remain closed, and vice versa, to in this manner provide means of lateral control.

The closure means for the slots are of such nature that when either one is moved to the slot-open position it will project below the under surface of the airfoil to prevent pressure from reaching a rearward area of the airfoil, and also to serve as a scoop for directing pressure of air into the slot for delivery into the otherwise rarefied zone above the airfoil.

Also, to increase the efficiency of the device the closure means may be composed of hinged members which respectively fill the slot spaces in the upper and lower surfaces of the airfoil, to close the slot, but which collapse in the slot opening operation to provide a maximum clearance through the slot for the passage of air pressure.

Other features and advantages of my invention will hereinafter appear.

In the drawings:

Figure 1 is a plan view of an airplane whose supporting airfoil is provided with my improved control means, and Fig. 2 is an enlarged end view of the supporting airfoil showing the slot-closing device in cross-section with the slot closed thereby, also showing said slot-closing device in dot and dash lines as moved to the slot-open position.

In Fig. 1 there is represented an airplane having the fuselage 1, supporting airfoil 2, power plant 3, and tail group 4.

No ailerons are employed for lateral control and instead slots 5 are formed diagonally through the airfoil, one at each side of the fuselage, these slots being respectively toward the outer portions of the airfoil span. Each slot 5 is extended diagonally through the airfoil, toward the leading edge thereof, to be in about the position of maximum ordinate, at an angle that lies rearwardly upward, and each slot is provided with suitable closure means that is operable to open and close said slot.

The closure means herein indicated consist of an upper plate 6, hinged upon a pintle 7 that is journalled in a bearing member 8, carried by the upper frame portion of the airfoil; a lower plate 9, hinged upon a pintle 10 that is journalled in a bearing 11, carried by the lower frame portion of the airfoil, and a forward plate 12 that is hinged to the plates 6 and 9 respectively by the pintles 13 and 14.

The closure device, thus constituted, is adapted to close the slot when its top plate 6 lies flush with the upper surface of the airfoil and its lower plate 9 lies flush with the under surface of said airfoil, as appears in full lines in Fig. 2, this being the normal position of said device. But when the closure device is moved downwardly, to expose a clearance through the slot, then the plates 6, 9 and 12 will partially collapse upon their hinges to permit the passage of air pressure from the under surface of the airfoil, through the slot, and into the rarefied area above the airfoil. This condition is accentuated by reason of the forward plate 12, when the closure device is opened, lying forwardly inclined, in the manner of a scoop, below the airfoil, and thus serving to direct the pressure of air upwardly through the open slot.

The lines of arrows show the courses of air flow, and the filling of the partial vacuum above the airfoil.

As means for operating each closure device

I have shown a lever arm 15 engaging the upper plate 6 and a flexible connector 16 extended from said arm in opposite directions, to pulleys 17 mounted within the airfoil, whence the opposite ends of said connector pass to suitable control means, not shown, for manipulation by the pilot.

It is to be understood that the respective slot closure devices are operable independently, because, obviously, if a left bank is desired, only the slot closure means at the left side of the airfoil will be opened, and if a right bank is desired only the slot closure means at the right side will be opened.

Variations within the spirit and scope of my invention are equally comprehended by the foregoing disclosure.

I claim:

1. The combination with an airplane of a supporting airfoil having a slot therethrough near each opposite end thereof, respective closure means, hinged to the airfoil, for said slots, said closure means composed of an upper member, a lower member and a forward member, said members being in hinged relation and normally closing the slot, means for moving said closure means downwardly to open the slot whereby the hinged members partially collapse and said forward member serves as a scoop to direct pressure upwardly through said slot, and said moving means also serving to replace the closure means in the slot.

2. The combination with an airplane of a supporting airfoil having a slot therethrough respectively near each opposite end thereof, respective closure means for said slots, said closure means co-acting with the forward boundary of said slots to provide clearances extending in an upwardly rearward direction, and independent means for separately operating said closure means.

3. The combination with an airplane of a supporting airfoil having a slot therethrough respectively near each opposite end thereof, respective closure means for said slots, said closure means co-acting with the forward boundary of said slots to provide clearances of variable areas extending in an upwardly rearward direction, and independent means for separately operating said closure means.

4. The combination with an airplane of a supporting airfoil having a slot therethrough respectively near each opposite end thereof, the forward wall of said slot being rearwardly and upwardly inclined, and respective closure means for said slots including a plate whose plane surface lies contactingly in opposed relation to said forward wall in the slot closed position of said closure means, said plate being movable away from said forward wall in the slot opening movement of said closure means.

5. The combination with an airplane of a supporting airfoil having a slot therethrough respectively near each opposite end thereof, the forward wall of said slot being rearwardly and upwardly inclined, respective closure means for said slots including a plate whose plane surface lies contactingly in opposed relation to said forward wall in the slot closed position of said closure means, said plate being movable away from said forward wall in the slot opening movement of said closure means, and independent means for separately operating said closure means.

6. The combination with an airplane of a supporting airfoil having a slot therethrough respectively near each opposite end thereof, and respective closure means for said slots, said closure means comprising hinged connecting members adapted to occupy the slot spaces in the upper and lower surfaces of the airfoil, to close the slots, said hinged members adapted to be moved downwardly into slot open positions to provide an inclined scoop for directing pressure of air upwardly and rearwardly through a slot.

7. The combination with an airplane of a supporting airfoil having a slot therethrough respectively near each opposite end thereof, respective closure means for said slots, said closure means comprising hinged connecting members adapted to occupy the slot spaces in the upper and lower surfaces of the airfoil, to close the slots, said hinged members adapted to be moved downwardly into slot open positions to provide an inclined scoop for directing pressure of air upwardly and rearwardly through a slot, and independent means for separately operating said closure means.

THOS. B. LAVELLE.